United States Patent [19]

Lacklison

[11] 3,739,360

[45] June 12, 1973

[54] METHOD OF MAGNETIC DATA STORAGE

[75] Inventor: David Edward Lacklison, Crawley, England

[73] Assignee: U.S. Philips Corporation, New York, N.Y.

[22] Filed: Nov. 10, 1971

[21] Appl. No.: 197,457

[30] Foreign Application Priority Data

Nov. 13, 1970 Great Britain .................. 54,134/70

[52] U.S. Cl. 340/174 YC, 340/174 TF, 340/174 SC

[51] Int. Cl. ........................ G11c 11/14, G11c 11/42

[58] Field of Search ............. 340/174 TF, 174 YC, 340/174 SC, 174.1 M; 346/74 M, 74 MT

[56] References Cited

UNITED STATES PATENTS

| | | | |
|---|---|---|---|
| 3,648,260 | 3/1972 | Gyorgy et al. ................ | 340/174 TF |
| 3,638,207 | 1/1972 | Smith et al. .................... | 340/174 TF |

OTHER PUBLICATIONS

IBM Technical Disclosure Bulletin – Vol. 13 No. 7 Dec. 1970 pgs. 1788–1790

*Primary Examiner*—James W. Moffitt
*Attorney*—Frank R. Trifari

[57] ABSTRACT

A method of magnetic data storage in which magnetic domains are generated and moved to desired locations in a platelet of magnetic material exhibiting photomagnetic properties, e.g., $FeBO_3$ by exposing the platelet in the desired locations to electromagnetic radiation.

6 Claims, 3 Drawing Figures

Figure 1:
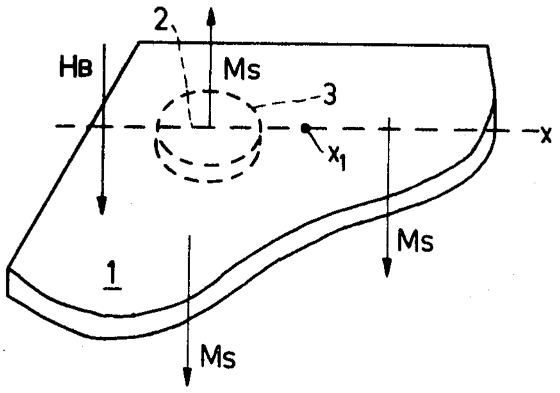

*INVENTOR.*
DAVID EDWARD LACKLISON

*BY*

AGENT

METHOD OF MAGNETIC DATA STORAGE

The invention relates to a device for the magnetic storage of data and relates in particular to a device which comprises a platelet of a magnetic material which can support magnetic domains which can move about in the platelet to provide storage such as for information, logic or display purposes.

From IEEE Transactions on Magnetics, vol. 5, No. 3, Sep., 1969, pp. 544–555 it is known that magnetic domains can be formed under certain circumstances when a platelet of magnetic material with an easy axis of magnetisation normal to the plane of the plate is subjected to an external biasing magnetic field which is also normal to the platelet. A magnetic domain then manifests as a localized region in which the magnetization is directed opposite to the direction of the external field. Magnetic domains thus produced may be moved through the platelet in various known manners and be retained in predetermined positions, for example, by means of a pattern of a soft magnetic material provided on the surface of the plate. The domains may be moved about to different positions in the platelet by means of technics which are complicated in themselves and which are based on the use of magnetic fields. See, for example, Electronics, Sept. 1, 1969, pp. 83–87.

It is the object of the present invention to provide a suitable material for use in a data storage device as described above and which moreover presents the possibility due to its particular properties to manipulate the magnetic domains in a new and simple manner, i.e., to move and fix them, respectively.

The data storage device according to the invention is characterized in that the platelet of magnetic material comprises at least a layer of a material having photomagnetic properties.

A material having photomagnetic properties is to be understood to mean herein a magnetisable material in which due to exposure to electromagnetic radiation a variation occurs in the anisotropy field, in the coercive force and/or in particular in the magnetic permeability. This phenomenon which has become known in literature a "photomagnetic effect" is described, inter alia, in IEEE Transactions on Magnetics, Sept., 1969, volume 5, No. 3, pp. 467–471 which relates in particular to polycrystalline, Si-doped YIG ($Y_3FE_5O_{12}$:Si) and to monocrystalline, Ga-doped $CdCr_3Se_4$ ($CdCr_3Se_4$:Ga).

A preferred embodiment of the device according to the invention is characterized in that the material having photomagnetic properties contains essentially $FeBO_3$, for example, in the form of a slice cut from an $FeBO_3$ single cristal.

The expression "containing essentially $FeBO_3$" is to be understood to mean that the composition of the magnetisable material must essentially satisfy the formula $Fe^{3+}BO_3^{3-}$, in which, however, either a minority of the $Fe^{3+}$ ions and/or a minority of the $BO_3^{3-}$ ions may be replaced, or be deviated from stoichiometry. This will be described in detail hereinafter.

Ferric borate ($FeBO_3$) is a transparent (green-transmitting) ferromagnetic material having an easy axis of magnetisation. It has the calcite structure and a Curie temperature of 348° K.

The manufacture of $FeBO_3$ single crystals is known, for example, from Applied Physics Letters, Vol. 14, No. 11, June 1, 1969.

The material having photomagnetic properties may include additives or doping ingredients to suitably modify its properties for the data storage devices described above. In this connection, Mg-doped or Cu-doped $FeBO_3$ has proved to be very suitable.

The invention furthermore relates to a method of storing data which is characterized by the following steps:

the generation and movement of magnetic domains in a platelet of a magnetic material which also shows photomagnetic properties and the fixing and moving, respectively, of one or more magnetic domains by exposing the plate in the desired locations to electromagnetic radiation.

A first preferred embodiment of the method according to the invention is characterized in that a platelet of a magnetic material is used which has the property that the magnetic permeability upon exposure to electromagnetic radiation decreases and that one or more magnetic domains generated in the plate and present at the desired locations are fixed in said locations by exposing the said locations to electromagnetic radiation.

A second preferred embodiment of the method according to the invention is characterized in that a platelet of a magnetic material is used which has the property that the magnetic permeability upon exposure to electromagnetic radiation increases and that one or more magnetic domains generated in the plate and present in non-desired locations are moved away from said locations by exposing the said locations to electromagnetic radiation.

Dependent upon the photomagnetic properties of the relevant material, on the one hand the possibility therefore exists for a magnetic domain which is present in an unexposed location to be moved to another location, while the domains which may not be moved are stabilized by the exposure and on the other hand it is posible, by a different choice of the photomagnetic material, just to effect the movement of a magnetic domain by means of a electromagnetic radiation. Such a beam is preferably provided in the form of pulses of radiation.

Although with the photomagnetic materials available at present the photomagnetic effect is generally found to be persistent only at comparatively low temperatures, the operating temperature need not necessarily be a limitation on a data storage device constructed according the present invention. Also in the case the photomagnetic effect is non-persistent, but is effective, for example, for only 1 msec., which is the case for cetain materials at room temperature, this short time interval is of sufficient length to carry out certain operations, such as switching operations.

Figure 2:
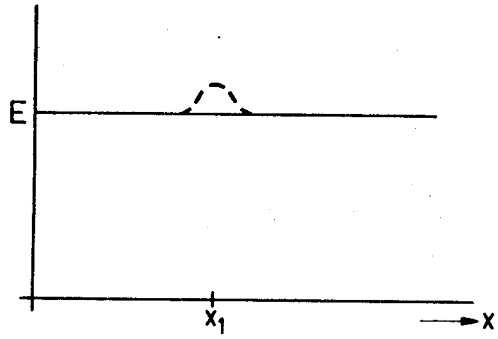
Figure 3:
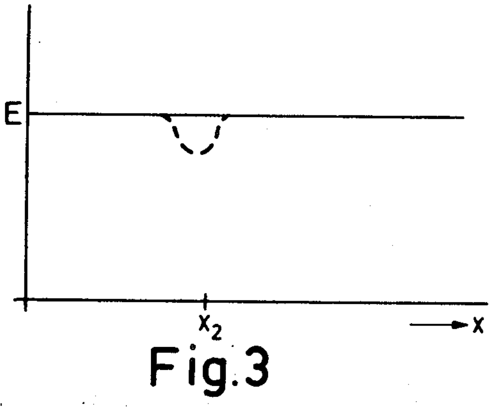

The invention will now be described with reference to the accompanying drawing, in which FIG. 1 diagrammatically shows a magnetic domain in a plate of a magnetic material FIG. 2 is a graph of the energy E of a domain wall as a function of the location of the wall in a plate of nominally pure $FeBO_3$, and FIG. 3 is a similar graph drawn, however, for Cu-doped $FeBO_3$.

FIG. 1 shows a platelet 1 of a magnetic material having an easy axis of magnetisation which is normal to the platelet, the platelet being present in an external biasing magnetic field $H_B$ the direction of which is also normal to the platelet. The magnetisation $M_s$ in the platelet 1 is mainly parallel to the direction of the biasing magnetic field but it is possible that a magnetic domain 2 in the platelet exists within which the magnetisation is opposite to the direction of the biasing magnetic field. The domain 2 is bounded by a domain wall 3.

It is known from the above-mentioned publications how such domains can be generated and can be moved about through the platelet so that they can be positioned at particular locations to provide a data storage device. One method of creating such specific locations is, for example, to evaporate a pattern of a soft magnetic material on the surface of the plate. Various techniques including the use of magnetic fields around a domain from one fixed location to the other have so far been devised. This provides possibilities for binary counting or for data storage. Magnetic domains may also be used in shift registers in which a row of fixed locations is present and a domain is propagated along said row.

FIG. 2 is a graph showing the variation of the energy E of the domain wall 3 in a cross-section taken on the line X when the platelet shown in FIG. 1 is exposed to electromagnetic radiation at the location $X_1$. In this case the plate consists of nominally pure $FeBO_3$ and is manufactured from a single crystal by cutting a slice from said single crystal at angle to the crystallographic C-plane and inducing in said slice a maximum anisotropy perpendicular to the surface. In the present case this letter was done by subjecting the surface of the crystal to a polishing operation which produced a compressive strain that give rise to the required anisotropy.

Once a magnetic domain is introduced in the plate, the domain 2 enclosed by its domain wall 3 can be moved about freely through the plate. The magnetic force required to do this has a substantially constant value. When, however, a light beam is directed on the point $X_1$ of the surface of the platelet, the irradiation causes at that area a peak in the domain wall energy as is denoted by the broken line, as a result of which the wall will be moved to a lower energy position. This was because the magnetic permeability of nominally pure $FeBO_3$ increases upon exposure to light.

As regards the already mentioned YIG : Si known from literature, the occurrence of the "photomagnetic" effect is ascribed to a radiation induced redistribution of magnetic ions over inequivalent lattice places in the crystal. In analogy with this it is assumed that also in the case of $FeBO_3$ a mechanism which makes the $Fe^{3+}$lattice places non-equivalent is to be considered.

This mechanism may be a deviation from stoichiometry. From a chemical analysis of the specimen used in the above-described experiments it has been found, for example, that the nominally pure $FeBO_3$ has an oxygen deficiency. A non-occupied oxygen location may be responsible for a local reduction of the symmetry relative to two adjacent Fe-ions.

The "doping" of the crystal with foreign ions may also have such an effect. In this connection it should be noted that in Cu-doped and Mg-doped $FeBO_3$, respectively, a reduction of the permeability is found to occur upon exposure to light in accordance with the effect occurring in the known (YIG : Si). In the case of the non-intentional doped nominally pure $FeBO_3$, however, it is found on the contrary that an increase of the permeability occurs on exposure to light. In particular, a light beam incident on a specimen cooled in the dark to 77° K and having a wavelength between 0.4 and 1.1 microns and an intensity of $10^{-2}$ Watt/sq.cm shows an increase of the magnetic permeability by 50 percent in 10 seconds.

The result of an experiment carried out on a type of material different from the case shown with reference to FIG. 2 is shown in FIG. 3. In this case the material used for the platelet was Cu-doped $FeBO_3$. In this material the magnetic permeability thus decreases by exposure to light so that the domain wall energy at the area of the exposed point $X_1$ is reduced as is shown by the broken line. This provides a stable location for the domain wall. Magnetic fields under the influence of which the relevant domain would move normally now cause only a movement of adjacent domains, if any. Exposing the whole platelet to radiation would fix the locations of domains already present in the platelet while new domains could be introduced into the platelet and moved to required locations.

It is to be noted that the variations of the magnetic permeability locally caused by exposing to electromagnetic radiation can be made undone by heating the material.

The foregoing descriptions of embodiments of the invention have been given by way of example only and a number of modifications may be made without departing from the scope of this invention. For example, photomagnetic materials other than $FeBO_3$ may be used to generate magnetic domains in it and manipulating these by means of light, i.e., to fix and move them, respectively.

What is claimed is:

1. A method of storing magnetic data comprising the steps of generating and moving magnetic domains in a platelet of a magnetic material having photomagnetic properties, and fixing and moving, respectively, of at least one of the magnetic domains by exposing the platelet at desired locations to electromagnetic radiation.

2. A method as claimed in claim 1, wherein the platelet has a magnetic permeability which upon exposure to electromagnetic radiation increases and at least one of the magnetic domains generated in the platelet and present in non-desired locations being moved away from said locations by exposing the said locations to electromagnetic radiation.

3. A method as claimed in claim 2, wherein the magnetic material is $FeBO_3$ and the electromagnetic radiation used has a wavelength between 0.4 and 1.1 microns.

4. A method as claimed in claim 1, wherein the platelet has a magnetic permeability which upon exposure to electromagnetic radiation decreases and at least one of the magnetic domains generated in the platelet and present at desired locations being fixed in the platelet in said locations by exposing the said locations to electromagnetic radiation.

5. A method as claimed in claim 4, wherein the magnetic material is Mg-doped ferric borate and the electromagnetic radiation used has a wavelength between 0.4 and 1.1 microns.

6. A method as claimed in claim 4, wherein the magnetic material is Cu-doped ferric borate and the electromagnetic radiation used has a wavelength between 0.4 and 1.1 microns.

* * * * *